US007421437B2

(12) United States Patent
Hoeft et al.

(10) Patent No.: US 7,421,437 B2
(45) Date of Patent: Sep. 2, 2008

(54) SYSTEM AND METHOD FOR A DATA DICTIONARY CACHE IN A DISTRIBUTED SYSTEM

(75) Inventors: Kerstin Hoeft, Walldorf (DE); Michael Tsesis, Heidelberg (DE); Reiner Hammerich, Rauenberg (DE)

(73) Assignee: SAP AG, Walldorf (DE)

( * ) Notice: Subject to any disclaimer, the term of this patent is extended or adjusted under 35 U.S.C. 154(b) by 372 days.

(21) Appl. No.: 10/704,924

(22) Filed: Nov. 10, 2003

(65) Prior Publication Data

US 2005/0102277 A1    May 12, 2005

(51) Int. Cl.
G06F 17/30 (2006.01)
G06F 7/00 (2006.01)
(52) U.S. Cl. .............................. 707/100; 707/2; 707/10
(58) Field of Classification Search ............... 707/1–10, 707/100–104.1
See application file for complete search history.

(56) References Cited

U.S. PATENT DOCUMENTS

| 5,448,726 | A | * | 9/1995 | Cramsie et al. ......... 707/103 R |
| 5,596,744 | A | * | 1/1997 | Dao et al. .................... 707/10 |
| 5,634,053 | A | * | 5/1997 | Noble et al. .................. 707/4 |
| 2003/0097383 | A1 | * | 5/2003 | Smirnov et al. ............. 707/204 |
| 2004/0054569 | A1 | * | 3/2004 | Pombo et al. .................. 705/7 |
| 2004/0210500 | A1 | * | 10/2004 | Sobel et al. ................... 705/35 |

* cited by examiner

*Primary Examiner*—Hosain T Alam
*Assistant Examiner*—Sangwoo Ahn
(74) *Attorney, Agent, or Firm*—Blakely, Sokoloff Taylor and Zafman LLP (57) ABSTRACT

A system and method to provide a data dictionary cache in a distributed system is disclosed. An application server may include a data dictionary broker agent to provide an interface between an underlying data dictionary and an application. The application server may also include one or more data dictionary caches to provide efficient access to frequently requested system information.

16 Claims, 7 Drawing Sheets

FIG. 1

(Prior Art)

SYSTEM AND METHOD FOR A DATA DICTIONARY CACHE IN A DISTRIBUTED SYSTEM

TECHNICAL FIELD

Embodiments of the invention generally relate to the field of data dictionaries and, more particularly, to a system and method for a data dictionary cache in a distributed system.

BACKGROUND

Figure 1:
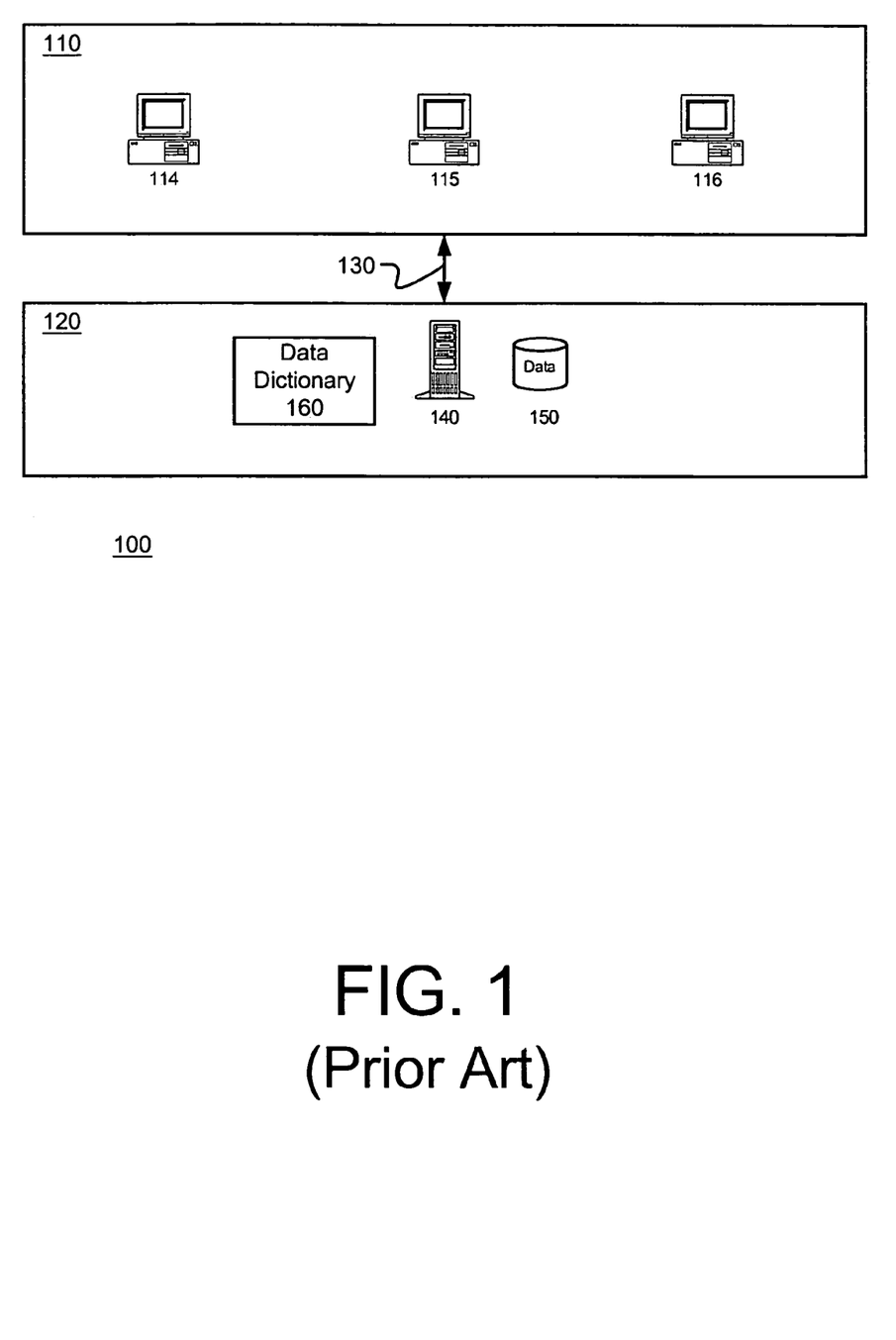
FIG. 1 is a block diagram of conventional distributed system 100.

FIG. 1 is a block diagram of conventional distributed system 100. Conventional distributed system 100 includes user layer 110 and data access layer 120. User layer 110 may provide the presentation logic and the business logic for conventional distributed system 100. The term "presentation logic" refers to computer software (or simply software) that determines how information is provided to a user and how the user interacts with an application. The term "application" refers to software that performs work, such as data creation or manipulation. "Business logic" refers to software that performs data processing. User layer 110 includes user terminals 114-116. User terminals 114-116 may be, for example, general purpose computing devices.

Data access layer 120 provides a persistent data store for conventional distributed system 100. Data access layer 120 includes computing device 140, data source 150, and data dictionary 160. Computing device 140 may a general purpose computing device or a specialized database computing device. Computing device 140 includes a Database Management System (DBMS) to control the data in data source 150 including the overall organization of the data, retrieval of the data, and integrity of the data.

Data dictionary 160 provides a source of information in which the system data for distributed system 100 is defined in a logical way. System information includes information whose function is to define the semantic and syntactic properties of operational data, such as the type, length, and relationships of operational data. System information that is defined in data dictionary 160 is, generally, available to applications operating on user terminals 114-116. For example, applications operating on user terminals 114-116 may use data or variables that are defined in data dictionary 160. Thus, any change to the data and/or variables defined in data dictionary 160 may automatically affect the applications operating on user terminals 114-116. In addition, services sitting on top of the data dictionary use the defined types and values.

Distributed systems are increasingly using an application layer between user layer 110 and data access layer 120. To provide services to user layer 110, an application layer needs access to the information stored in the data dictionary. Also, distributed systems having an application layer may also have more than one database system in the data access layer. Thus, an application layer may need access to the information stored in multiple database systems of a data access layer.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of the invention are generally directed to a system and method for a data dictionary cache in a distributed system. In an embodiment, software operating on an application server receives a request for system information (e.g., a data type). The application server may reference a data dictionary cache to obtain the requested system information. As further described below, in one embodiment, the application server may select one of a plurality of data dictionary caches to provide the requested system information.

Figure 2:
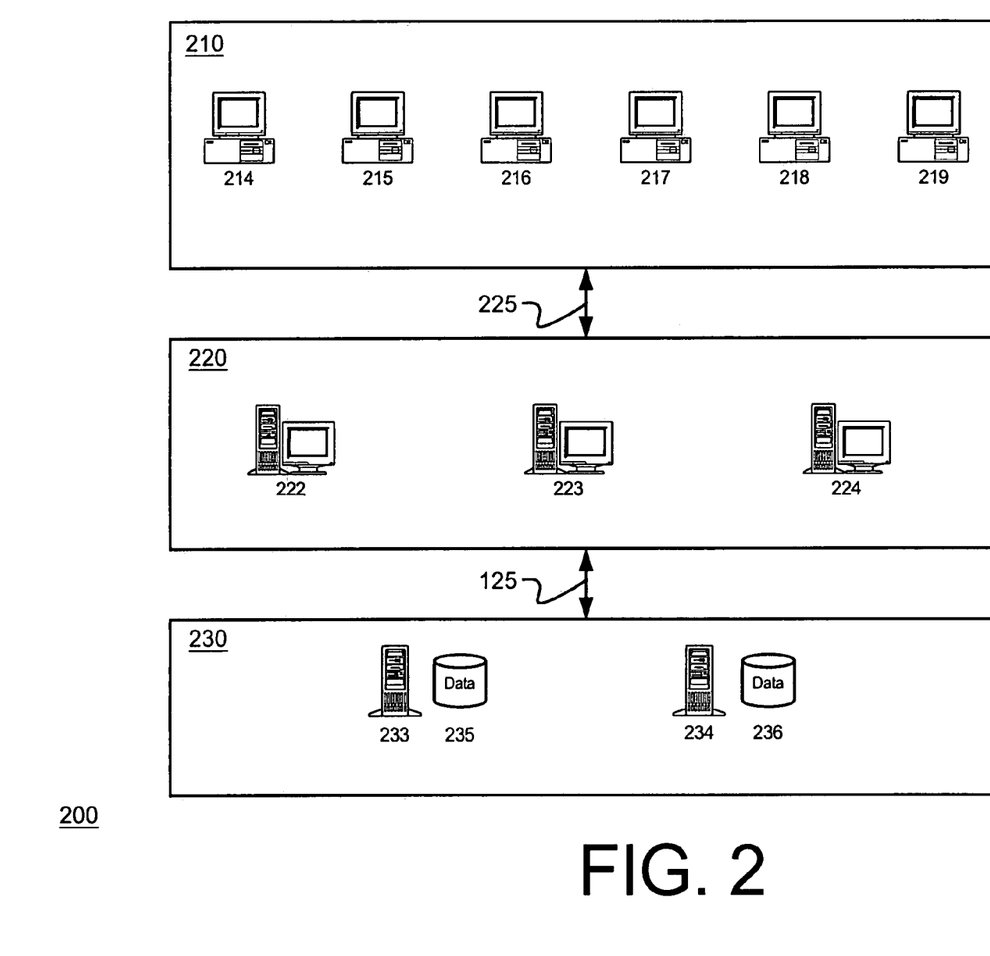
FIG. 2 is a simplified block diagram of distributed system 200, implemented according to an embodiment of the invention.

FIG. 2 is a block diagram of distributed system 200. The illustrated embodiment of distributed system 200 includes: user layer 210, application layer 220, and data access layer 230. Some or all of the elements within each layer of distributed system 200 may be interconnected via a network (e.g., a Local Area Network (LAN)). Alternative embodiments of distributed system 200 may include more layers, fewer layers, and/or different layers.

User layer 210 is the interface between distributed system 200 and one or more users. The illustrated embodiment of user layer 210 includes user terminals 214-219. One or more of user terminals 214-219 may collect user input and send it to application layer 220 over network connection 225. Network connection 225 may be a wired or wireless connection to a Local Area Network (LAN), a Wide Area Network (WAN), a Metropolitan Area Network (MAN), and/or the Internet. User terminals 214-219 may be personal computers, notebook computers, personal digital assistants, telephones, and the like. In an embodiment in which network connection 225 connects to the Internet, one or more of user terminals 214-219 may have a Web browser to interface with the Internet.

Application layer 220 includes application servers 222-224. An application server broadly refers to a computing device that performs data processing. In a three-tier client/server environment, such as distributed system 200, application servers 222-224 may provide the business logic for distributed system 200. In an embodiment, application layer 220 includes a computing device (e.g., called a dispatcher) to perform load balancing among application servers 222-224. In an embodiment in which application layer 220 exchanges information with user layer 210 via the Internet, one or more of application servers 222-224 may be described as a Web application server. Application servers 222-224 may be implemented according to any of the Java 2 Enterprise Edition Specifications, for example, v1.4, published on Jul. 12, 2002 (hereinafter the J2EE Standard). The term J2EE application server broadly refers to an application server that implements, at least in part, one of the J2EE specifications.

Figure 3:
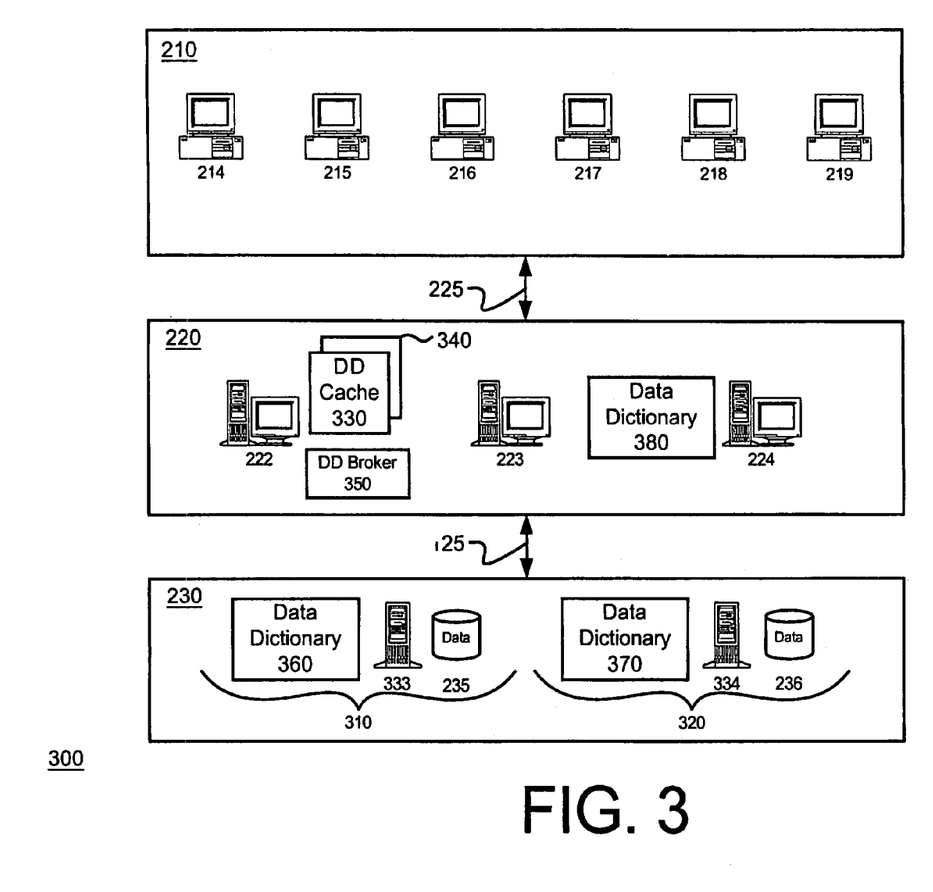
FIG. 3 is a block diagram of distributed system 300 providing data dictionary caches, according to an embodiment of the invention.

FIG. 3 is a block diagram of distributed system 300 implemented to provide a data dictionary cache, according to an embodiment of the invention Many of the elements shown in FIG. 3 are similar to elements shown in FIG. 2 and those elements have similar (or the same) reference numbers. In addition, FIG. 3 illustrates database systems 310 and 320, data dictionary caches 330 and 340, and data dictionary broker agent 350.

The term database system refers to the combination of hardware and software that provides a persistent data store. Database system 310 includes data dictionary 360, computing device 333, and data source 235. Database system 320 similarly includes data dictionary 370, computing device 334, and data source 236. Computing devices 333 and 334 may include a general computing device or a specialized computing device. In an embodiment, computing devices 333 and/or 334 also include logic, for example, to provide a database management system.

In an embodiment, data dictionary 360 may provide system information for some of the applications (e.g., Customer Relationship Management (CRM) applications) operating on application servers 222-224. Similarly, data dictionary 370 may provide system information for a different set of applications (e.g., Human Resources (HR) applications) operating on application servers 222-224. The system information provided by data dictionaries 360 and 370 may include the structure of data types and the relationships between data types used in distributed system 300. Data dictionary 380 illustrates that, in an embodiment, one or more data dictionaries may be on an application server (e.g., application server 224 in application layer 220). In such an embodiment, one or more data dictionary caches may cache system information provided by data dictionary 380.

A data type defines, for example, how data is stored in memory. Different data types may exist because data may be used differently in distributed system 300. For example, character-type data is typically used to store and display values, whereas numerical-type data is used to perform calculations. Examples of data types used in distributed system 300 are further described below with reference to FIG. 5. Also, certain applications may require specifically defined data types. For example, a CRM application operating on application server 222 may use data types defined in data dictionary 360, whereas an HR application operating on application server 222 may use data types defined in data dictionary 370.

Data dictionary caches 330 and 340 buffer at least a portion of a data dictionary. In an embodiment, data dictionary caches 330 and 340 buffer at least a portion of data dictionaries 360 and 370, respectively. In an alternative embodiment, data dictionary cache 330 buffers system information (e.g., data types and related services) for a first application (or set of applications, e.g., CRM applications) and data dictionary cache 340 buffers system information for a second application (or set of applications, e.g., HR applications). The term "cache" refers to memory (or a region of memory) whose function is to store information that is likely to be used again. A data dictionary cache refers to memory (or a region of memory) in an application server that stores information from an associated data dictionary. Data dictionary caches 330 and 340 may be volatile memory, non-volatile memory, or a combination thereof. Further examples of memory suitable for a data dictionary cache are further described below with reference to FIG. 7.

In an embodiment, data dictionary broker agent (DD broker agent) 350 provides an interface between data dictionaries 360 and 370 and application server 222. DD broker agent 350 may receive, for example, requests for a data type from an application and determine whether the requested data type is available in data dictionary cache 330 and/or data dictionary cache 340. If the requested data type is not currently stored in one of data dictionary caches 330 or 340, DD broker agent 350 may access either data dictionary 360 or data dictionary 370 to obtain the requested data type. DD broker agent 350 is further discussed below with reference to FIGS. 5-7.

Figure 4:
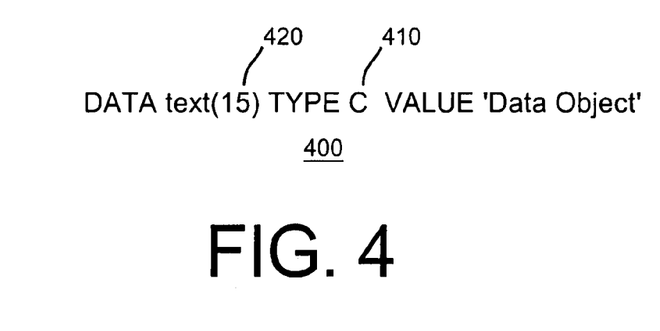
FIG. 4 illustrates exemplary DATA statement 400, suitable for requesting a data type according to an embodiment of the invention.

FIG. 4 illustrates an exemplary data statement 400 that may be used to request a data type, in an embodiment of the invention. A data type defines the attributes of a data object. Reference numeral 410 illustrates that the requested data type is "c" which, in the illustrated embodiment, refers to a character-type data type. The requested data object may have a length of 15 characters as illustrated by reference numeral 420. The data type of a data object determines how an application will handle the data. Data statement 400 may be used to create a data object that an application can access via the name "text." In the illustrated example, an application accessing the data object named "text" will store the object as character-type data in memory.

Figure 5:
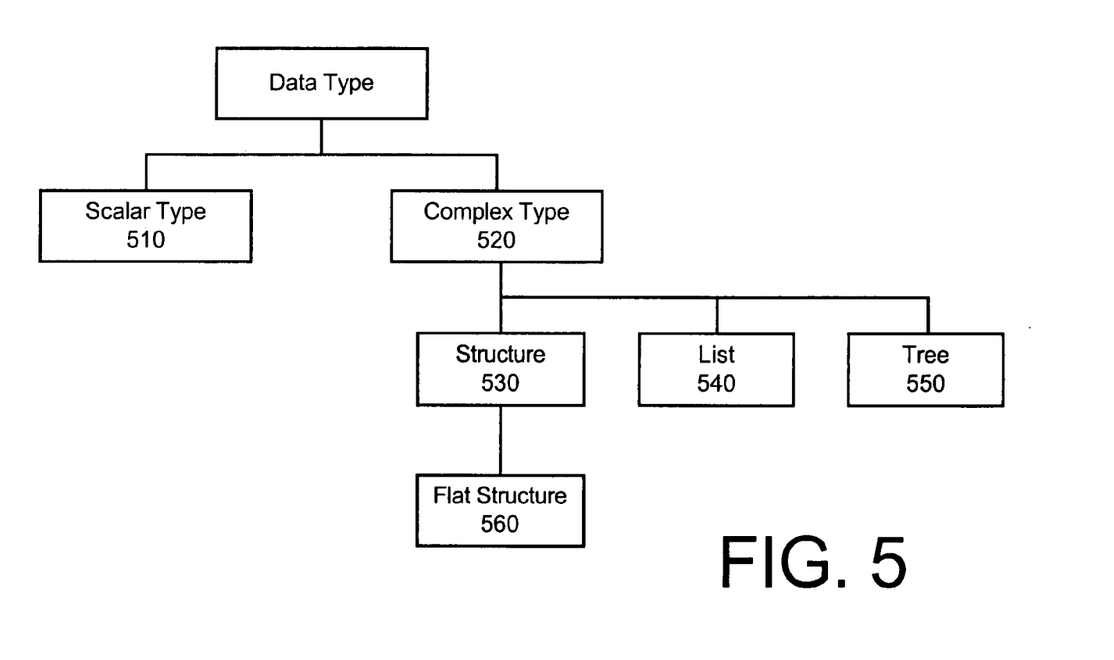
FIG. 5 illustrates exemplary data types available in an embodiment of the invention.

FIG. 5 is a conceptual illustration of data types available in an embodiment of the invention. In an embodiment, data types may be hierarchically organized into either scalar data type 510 or complex type 520. Scalar type 510 broadly refers to data types that hold a single data item such as an integer or a character. In an embodiment, scalar types may include: integer data types, string data types, floating point data types, and/or decimal data types. In an embodiment, data types may be written or encoded in a markup language. A "markup language" refers to a computer software language in which labels are embedded within text to distinguish individual elements or groups of elements for display and/or identification purposes. For example, in an embodiment, data types are encoded in one of the Extensible Markup Languages (XML), for example, the XML language promulgated by the World Wide Web Consortium (W3C) entitled, "Extensible Markup Language (XML) 1.0 (Second Edition)," 6 Oct. 2000 (hereinafter, the XML Standard). The term "markup language based" refers to a software entity written, and/or encoded, and/or formatted in one of the markup languages. Similarly, the term "XML based" refers to a software entity written, and/or encoded, and/or formatted in one of the XML languages.

Complex type 520 refers to data types that hold multiple data items. In an embodiment, complex type 520 includes structure data type 530, list data type 540, and/or tree data type 550. In an embodiment, structure data type 530 contains one or more named fields. Each of the two or more named fields may contain a data type of any type. In an embodiment, flat structure data type 560 refers to a structured data type in which all of the named fields are scalar data types. List data type 540 refers to an ordered group of elements belonging to the same data type. In an embodiment, tree data type 550 refers to a data type having one root element and zero or more non-root elements. Each non-root element may have one predecessor element and zero, one, or more successor elements.

Data types may be defined independently of the applications that use them. Applications may use data types to define data objects. The term "data object" refers to a self-contained module of data and its associated processing. In an embodiment, data objects comply with the Java Specification Request 12 entitled, "Java Data Objects (JDO) Specification," Apr. 30, 2002.

Figure 6:
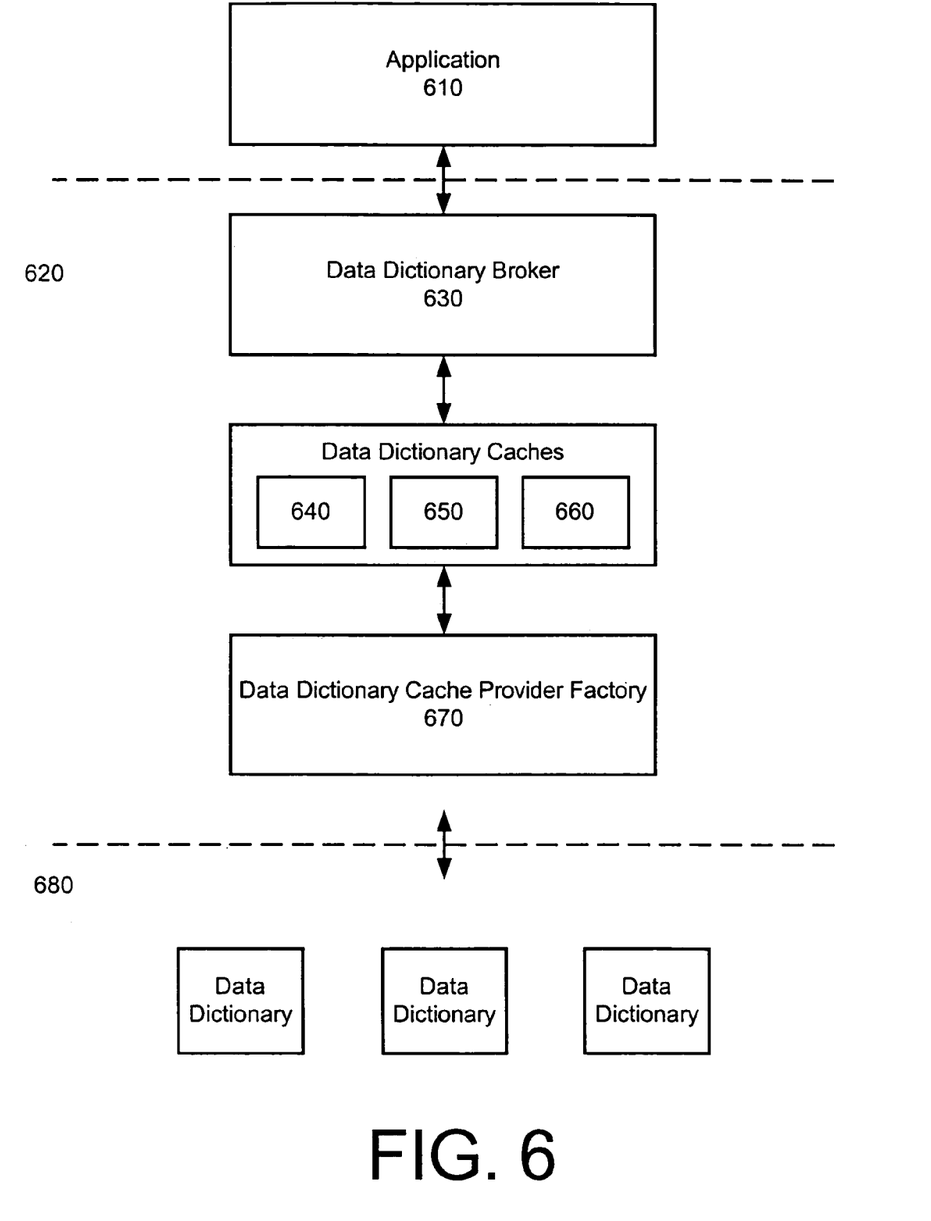
FIG. 6 is a block diagram illustrating a data dictionary broker service, according to an embodiment of the invention.

FIG. 6 is a block diagram illustrating a data dictionary broker service, according to an embodiment of the invention. In the illustrated embodiment, application 610 requests a data type from data dictionary server 620 (e.g., with DATA statement 400 shown in FIG. 4). In an embodiment, application 610 is operating on a user terminal in a user layer (e.g., user terminals 214-219 shown in FIG. 2). In an embodiment, application 610 is operating on an application server in the application layer (e.g., application servers 222-224 shown in FIG. 3). In an embodiment application 610 is a development tool used to develop software. Application 610 may also be part of the business logic of a distributed system (e.g., a CRM application or an HR application).

The illustrated embodiment of data dictionary cache service 620 includes data dictionary broker agent 630, data dictionary caches 640, 650, and 660, and data dictionary cache provider factory 670. Data dictionary (DD) broker agent 630 receives the request for a data type from application 610 and determines whether one (or more) of data dictionary caches 640, 650, and 660 contain the requested data type. In an embodiment, DD broker agent 630 implements a cache management policy for data dictionary caches 640, 650, and 660. The term "cache management policy" broadly refers to logic that performs the operations related to reading, storing, and maintaining information in a cache. In an embodiment, an implementation of a cache management policy dictates how DD broker agent 630 determines whether data dictionary caches 640, 650, and 660 contain the requested data type.

In an embodiment, if data dictionary caches 640, 650, and 660 do not contain the requested data type, then DD broker agent 630 obtains the requested data type from a data dictionary in data access layer 680. In an embodiment, DD broker agent 630 places the data type obtained from the underlying data dictionary into one of data dictionary caches 640, 650, and 660. Alternatively, DD broker agent 630 may use data dictionary cache provider factory 670 to generate a new data dictionary cache to store the obtained data type. Provider factory 670 is an object of the factory class as specified in the J2EE Standard. In an embodiment, provider factory 670 creates data dictionary caches according to the cache management policy implemented by data dictionary broker 630.

Figure 7:
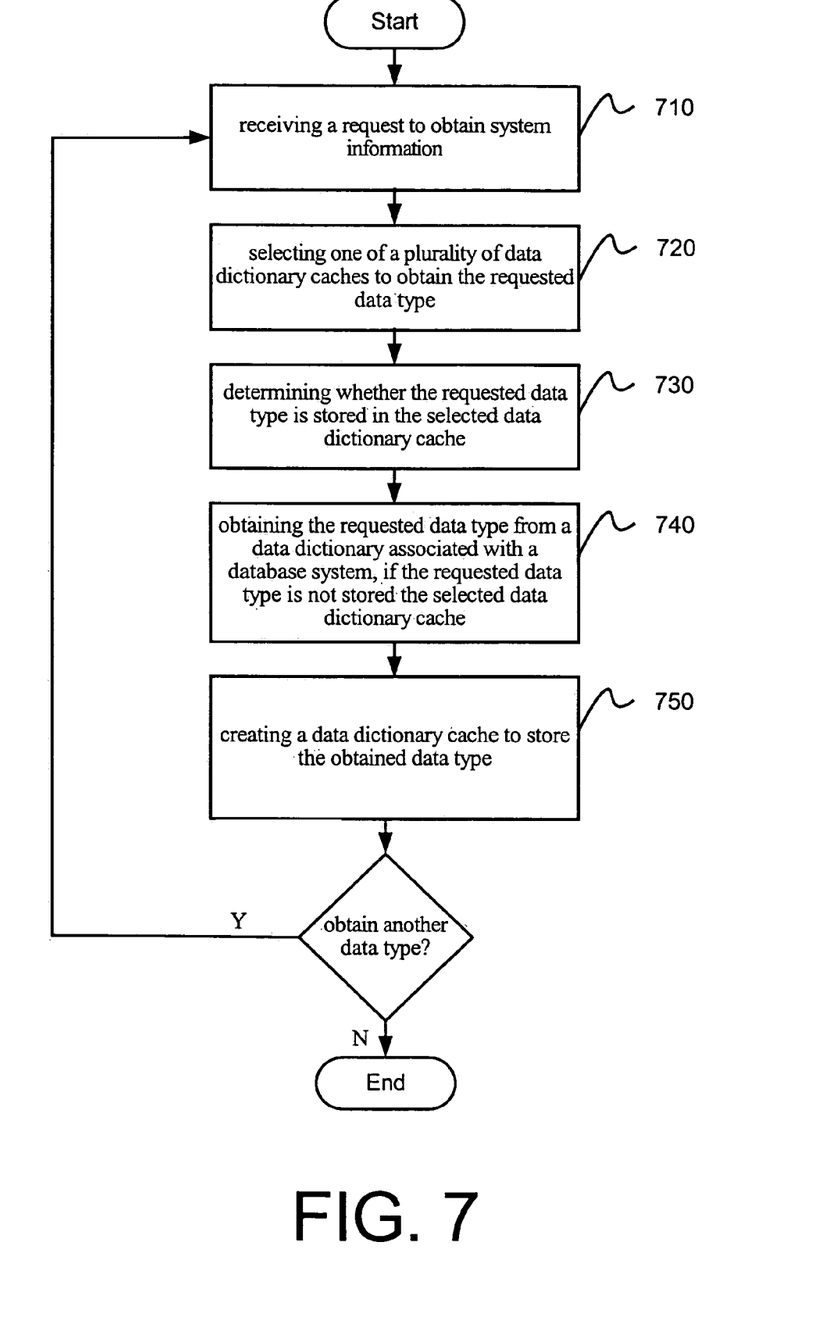
FIG. 7 is a flow diagram illustrating certain aspects of a method for obtaining a data type according to an embodiment of the invention.

Turning now to FIG. 7, the particular methods associated with embodiments of the invention are described in terms of computer software and hardware with reference to a flowchart. The methods to be performed by a data dictionary cache service may constitute state machines or computer programs made up of computer-executable instructions. Describing the methods by reference to a flowchart enables one of ordinary skill in the art to develop such programs including such instructions to carry out the methods on suitably configured computing devices (e.g., one or more processors of a node) executing the instructions from computer-accessible media. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement the teachings of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

FIG. 7 is a flow diagram illustrating certain aspects of a method for obtaining system information according to an embodiment of the invention. Referring to process block 710, a request to obtain system information is received. The requested system information may be, for example, a data type. In an embodiment, the request to obtain the data type complies with Java Specification Request 12 entitled, "Java Data Object Specification," Apr. 30, 2002. In alternative embodiments of the invention, the request to obtain a data type may comply with additional and/or other specifications. In an embodiment, the application sends the request to obtain a data type to a DD broker agent. The application may be, for example a development tool or part of the business logic of a distributed system. The request may be, for example, a request for a scalar data type or a complex data type.

Referring to process block 720, one of a plurality of data dictionary caches is selected to provide the requested data type. In an embodiment, selecting an appropriate data dictionary cache is regulated by a cache management policy implemented by the DD broker agent. In an embodiment, each data dictionary cache corresponds to a specific data dictionary in a data access layer. In an alternative embodiment, each data dictionary cache corresponds to a particular component of the business logic operating in a distributed system (e.g., CRM applications or HR applications).

The DD broker agent determines whether the requested data type is stored in the selected data dictionary cache at reference numeral 730. In an embodiment, the cache management policy implemented by the DD broker agent specifies how the DD broker agent searches the selected data dictionary cache. If the selected data dictionary cache does not contain the requested data type, the DD broker agent obtains the requested data type from an underlying data dictionary at 740. In an embodiment there is one associated data dictionary for each data dictionary cache.

Referring to process block 750, a new data dictionary cache is created to store the obtained data type. In an embodiment, an instance of a data dictionary cache provider factory (e.g., provider factory 670 shown in FIG. 6) creates the new data dictionary cache. A data dictionary cache provider factory may create an instance of a data dictionary cache in an available region of memory. In an embodiment, the data dictionary cache provider factory is compliant with the J2EE Standard. In alternative embodiments of the invention, the data dictionary cache provider factory may be compliant with a different specification.

Figure 8:
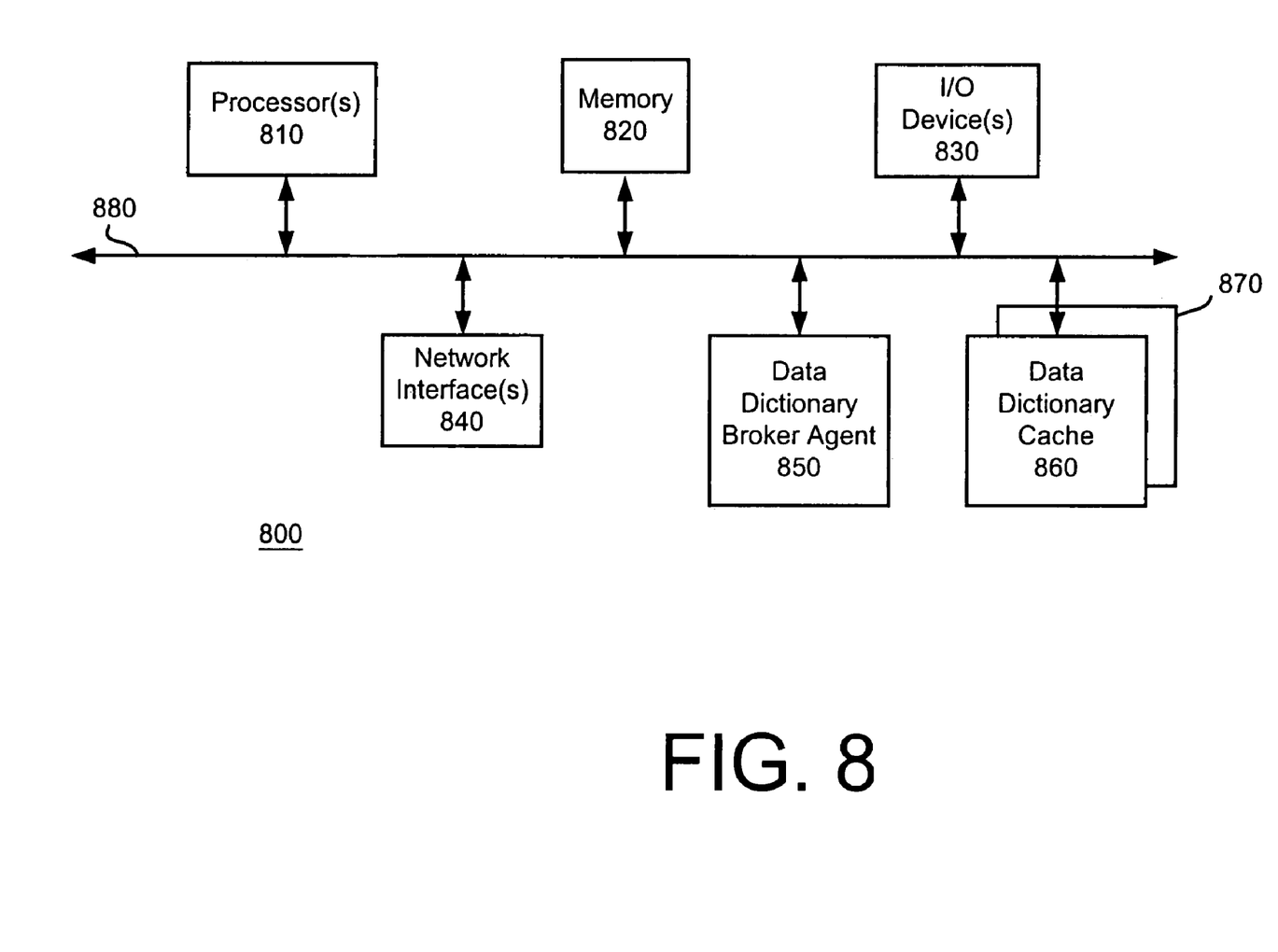
FIG. 8 is a block diagram of node 800 implemented according to an embodiment of the invention.

FIG. 8 is a block diagram of node 800 implemented according to an embodiment of the invention. Node 800 may include: processor(s) 810, memory 820, one or more Input/Output devices 830, network interface(s) 840, data dictionary broker agent 850, and data dictionary caches 860 and 870. The illustrated elements may be connected together through system interconnection 880. Processor(s) 810 may include a microprocessor, microcontroller, field programmable gate array (FPGA), application specific integrated circuit (ASIC), central processing unit (CPU), programmable logic device (PLD), and similar devices that access instructions from system storage (e.g., memory 820), decode them, and execute those instructions by performing arithmetic and logical operations.

Data dictionary cache agent 850 enables node 800 to provide an interface between a data dictionary (or data dictionaries) and an application (or applications) seeking data types and related services from the data dictionary. Data dictionary cache agent 850 may be executable content, control logic (e.g., ASIC, PLD, FPGA, etc.), firmware, or some combination thereof, in an embodiment of the invention. In embodiments of the invention in which data dictionary cache agent 750 is executable content, it may be stored in memory 820 and executed by processor(s) 810.

Data dictionary caches 860 and 870 improve access to the system information in underlying data dictionaries by storing frequently (and/or recently) requested system information (and/or other metadata) in the application layer of a distributed system. In an embodiment, data dictionary caches 860 and 870 may be implemented as objects in volatile memory in compliance with, for example, the J2EE Standard. In alternative embodiments, data dictionary caches 860 and 870 may implemented according to different specifications and/or may be created in non-volatile memory.

Memory 820 may encompass a wide variety of memory devices including read-only memory (ROM), erasable programmable read-only memory (EPROM), electrically erasable programmable read-only memory (EEPROM), random access memory (RAM), non-volatile random access memory (NVRAM), cache memory, flash memory, and other memory devices. Memory 820 may also include one or more hard disks, floppy disks, ZIP disks, compact disks (e.g., CD-ROM), digital versatile/video disks (DVD), magnetic random access memory (MRAM) devices, and other system-readable media that store instructions and/or data. Memory 820 may store program modules such as routines, programs, objects, images, data structures, program data, and other program modules that perform particular tasks or implement particular abstract data types that facilitate system use.

One or more I/O devices 830 may include a hard disk drive interface, a magnetic disk drive interface, an optical drive interface, a parallel port, serial controller or super I/O controller, serial port, universal serial bus (USB) port, a display device interface (e.g., video adapter), a network interface card (NIC), a sound card, modem, and the like. System interconnection 880 permits communication between the various elements of node 800. System interconnection 880 may include a wide variety of signal lines including one or more of a memory bus, peripheral bus, local bus, host bus, bridge, optical, electrical, acoustical, and other propagated signal lines.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A computer-implemented method comprising:
    receiving a request for system information, wherein the system information is associated with a data type, wherein the data type includes a scalar data type and a complex data type, wherein the scalar data type and the complex data type are organized hierarchically, the scalar data type including a single data object having an integer or a character, the complex data type including multiple data objects having one or more of structure data types, list data types, and tree data types;
    referencing a plurality of data dictionary cache at an application level to obtain the data type associated with the system information;
    determining whether the data type is stored in one or more of the plurality of data dictionary cache, wherein determining is preformed based on a cache management policy to perform operations relating to reading, storing, and maintaining information of the plurality of data dictionary cache;
    selecting a data dictionary cache from the plurality of data dictionary cache at the application level, if the data dictionary cache includes the data type;
    obtaining the data type from the data dictionary cache having the data type;
    obtaining the data type from a data dictionary at a data access level, if the data type is not found at the plurality of data dictionary cache, and creating a new data dictionary cache at the application layer to store the data type obtained from the data dictionary; and
    providing the requested system information via the data type.

2. The method of claim 1, wherein the data type comprises one or more of a scalar data type and a complex data type.

3. The method of claim 1, wherein the data type comprises a markup language-based data type including an Extensible Markup Language (XML) data type.

4. The method of claim 1, wherein the application level comprises an application server, the application server including a Web application server.

5. The method of claim 4, wherein the Web application server comprises a Java 2 Enterprise Edition (J2EE) application server.

6. An application server comprising:
    a data medium having a plurality of data dictionary cache at an application level; and
    a data dictionary server in communication with the plurality of data dictionary cache, the data dictionary server having an agent to
        receive a request for system information, wherein the system information is associated with a data type, wherein the data type includes a scalar data type and a complex data type, wherein the scalar data type and the complex data type are organized hierarchically, the scalar data type including a single data object having an integer or a character, the complex data type including multiple data objects having one or more of structure data types, list data types, and tree data types,
        reference the plurality of data dictionary cache to obtain the data type associated with the system information,
        determine whether the data type is stored in one or more of the plurality of data dictionary cache, wherein determining is preformed based on a cache management policy to perform is relating to reading, storing, and maintaining information of the plurality of data dictionary cache,
        select a data dictionary cache from the plurality of data dictionary cache at the application level, if the data dictionary cache includes the date type, obtain the data type from the data dictionary cache having the data type, obtain the data type from a data dictionary at a data access level, if the data type is not found at the plurality of data dictionary cache, and create a new data dictionary cache at the application layer to store the data type obtained from the data dictionary, and provide the requested system information via the data type.

7. The application server of claim 6, wherein the application server is coupled to one or more application servers over a network via a network interface.

8. The application server of claim 6, wherein the application server comprises a Web application server.

9. The application server of claim 8, wherein the Web application server comprises a Java 2 Enterprise Edition (J2EE) application server.

10. The application server of claim 6, wherein the data type comprise a markup language-based data type including an Extensible Markup Language (XML) data type.

11. A system comprising:
a client to send a request for system information, wherein the system information is associated with a data type; and a server coupled with the client, the server to
receive the request from the client,
reference a plurality of data dictionary cache at an application level to obtain the data type associated with the system information, wherein the data type includes a scalar data type and a complex data type, wherein the scalar data type and the complex data type are organized hierarchically, the scalar data type including a single data object having an integer or a character, the complex data type including multiple data objects having one or more of structure data types, list data types, and tree data types determine whether the data type is stored in one or more of the plurality of the data dictionary cache, wherein determining is preformed based on a cache management policy to perform operations relating to reading, storing, and maintaining information of the plurality of data dictionary cache, select a data dictionary cache from the plurality of data dictionary cache at the application level, if the data dictionary cache includes the date type, obtain the data type from the data dictionary cache having the data type, obtain the data type from a data dictionary at a data access level, if the data type is not found at the plurality of data dictionary cache, and create a new data dictionary cache at the application layer to store the data type obtained from the data dictionary, and provide the requested system information via the data type to the client.

12. The system of claim 11, wherein the data type comprises a markup language-based data type including an Extensible Markup Language (XML) data type.

13. The system of claim 11, wherein the server comprises an application server, the application includes a Web application server.

14. The system of claim 13, wherein the Web application server comprises a Java 2 Enterprise Edition (J2EE) application server.

15. An article of manufacture comprising a machine-readable medium having instructions which when executed causes a machine to:

receive a request for system information, wherein the system information is associated with a data type, wherein the data type includes a scalar data type and a complex data type, wherein the scalar data type and the complex data type are organized hierarchically, the scalar data type including a single data object having an integer or a character, the complex data type including multiple data objects having one or more of structure data types, list data types, and tree data types;

reference a plurality of data dictionary cache at an application level to obtain the data type associated with the system information;

determine whether the data type is stored in one or more of the plurality of the data dictionary cache, wherein determining is preformed based on a cache management policy to perform operations relating to reading, storing, and maintaining information of the plurality of data dictionary cache;

select a data dictionary cache from the plurality of data dictionary cache at the application level, if the data dictionary cache includes the date type;

obtain the data type from the data dictionary cache having the data type;

obtain the data type from a data dictionary at a data access level, if the data type is not found at the plurality of data dictionary cache, and create a new data dictionary cache at the application layer to store the data type obtained from the data dictionary; and provide the requested system information via the data type.

16. The article of manufacture of claim 15, wherein the instructions which when further executed, cause the machine to provide the data type to a client in response to the request received from the client.

* * * * *